(12) United States Patent
Pothetes

(10) Patent No.: US 9,351,607 B2
(45) Date of Patent: May 31, 2016

(54) OUTDOOR GRILL, OVEN AND FIRE PIT UNIT

(71) Applicant: HEPHAESTUS BBQ, INC., Stayton, OR (US)

(72) Inventor: Nicholas Louis Pothetes, Stayton, OR (US)

(73) Assignee: Hephaestus BBQ, Inc., Stayton, OR (US)

(*) Notice: Subject to any disclaimer, the term of this patent is extended or adjusted under 35 U.S.C. 154(b) by 98 days.

(21) Appl. No.: 14/145,718

(22) Filed: Dec. 31, 2013

(65) Prior Publication Data

US 2015/0004297 A1    Jan. 1, 2015

Related U.S. Application Data

(60) Provisional application No. 61/747,587, filed on Dec. 31, 2012.

(51) Int. Cl.
| | |
|---|---|
| *A47B 37/00* | (2006.01) |
| *F24B 3/00* | (2006.01) |
| *A47J 37/00* | (2006.01) |
| *A47J 37/04* | (2006.01) |
| *A47J 37/07* | (2006.01) |

(52) U.S. Cl.
CPC .............. *A47J 37/049* (2013.01); *A47J 37/00* (2013.01); *A47J 37/04* (2013.01); *A47J 37/0704* (2013.01); *A47J 37/0731* (2013.01); *A47J 37/0786* (2013.01)

(58) Field of Classification Search
CPC ....... A47J 37/04; A47J 37/0731; A47J 37/00; A47J 37/049; A47J 37/0704

USPC .............................................. 126/25 A, 25 R
See application file for complete search history.

(56) References Cited

U.S. PATENT DOCUMENTS

| | | | |
|---|---|---|---|
| 2,826,984 A | 3/1958 | Krull | |
| 2,968,301 A * | 1/1961 | Cowart | A47J 37/06 |
| | | | 126/25 A |
| 3,455,291 A | 7/1969 | Glass | |
| 3,699,876 A | 10/1972 | Ellis | |
| D272,885 S | 3/1984 | Famiglietti | |

(Continued)

FOREIGN PATENT DOCUMENTS

| | | | | |
|---|---|---|---|---|
| DE | 10058308 | | 6/2002 | |
| GB | 2417672 A | * | 3/2006 | .......... A47J 37/0704 |
| WO | 2012123875 | | 9/2012 | |

OTHER PUBLICATIONS

DE 10058308—Reindl, Josef—Jun. 6, 2002—English Translation.

*Primary Examiner* — William G Corboy
(74) *Attorney, Agent, or Firm* — McKee, Voorhees & Sease, PLC

(57) ABSTRACT

A multi-purpose unit configured for fire usage having a body with an interior volume selectively closable by doors attached to sidewalls spaced between a base and a top. The interior volume contains spaces for grilling, baking, and heating. The heating space houses a grate to support a heat source. The grate is positionable between a first position generally adjacent the base and a second position generally adjacent the baking or grilling space. The intensity of heat in the baking and grilling spaces is adjusted by positing the heat source closer to or further from the space. In one embodiment the heating space may be exposed by selectively opening one or more doors over the space for use as an outdoor fire pit.

5 Claims, 8 Drawing Sheets

(56) References Cited

U.S. PATENT DOCUMENTS

| | | | |
|---|---|---|---|
| 5,078,049 A | 1/1992 | Glanton | |
| 5,284,125 A * | 2/1994 | Hunziker | A47J 37/06 126/1 D |
| 5,347,977 A | 9/1994 | Lehikoinen | |
| D380,932 S | 7/1997 | Duray | |
| 5,711,209 A | 1/1998 | Guines | |
| D396,166 S | 7/1998 | Pavlich | |
| D439,316 S | 3/2001 | Coleman | |
| D460,893 S | 7/2002 | Rowe | |
| D468,416 S | 1/2003 | Coleman | |
| D470,356 S | 2/2003 | Kipps | |
| 6,748,939 B1 | 6/2004 | Gober | |
| 6,913,011 B1 * | 7/2005 | Snider | A47J 37/0704 126/25 R |
| 7,426,885 B2 | 9/2008 | McLemore | |
| D586,608 S | 2/2009 | May | |
| D598,698 S | 8/2009 | Lee | |
| 7,810,485 B2 | 10/2010 | Messmer | |
| 7,856,971 B2 | 12/2010 | Amaral | |
| 8,061,348 B1 * | 11/2011 | Rodriguez | F24B 1/182 126/1 B |
| 8,127,757 B1 | 3/2012 | Bourgeois | |
| D720,569 S * | 1/2015 | Hill | D7/334 |
| 2001/0035176 A1 | 11/2001 | Bush, III | |
| 2005/0121018 A1 | 6/2005 | Rosen | |
| 2007/0221191 A1 | 9/2007 | O'Brien | |

\* cited by examiner

OUTDOOR GRILL, OVEN AND FIRE PIT UNIT

CROSS-REFERENCE TO RELATED APPLICATIONS

This application claims priority under 35 U.S.C. §119 to provisional application Ser. No. 61/747,587, filed Dec. 31, 2012, which is hereby incorporated in its entirety.

BACKGROUND OF THE INVENTION

The use of grills for cooking is very popular for outdoor gatherings and many people have outdoor grills for personal use. Some grills may be configured to operate as outdoor baking devices as well. Additionally, many people desire to have outdoor fireplaces or fire pits for both warmth and ambience while enjoying the outdoor spaces of their homes. Outdoor heating devices that currently exist can often provide a combination of two of the elements of grilling, baking or providing a fireplace, but not all three.

It is desirable to have an apparatus that can perform the tasks of grilling, baking, and providing heat and ambience as a fireplace. It is also desirable that such an apparatus be easily changed in configuration to perform each task. Many existing multi-purpose apparatuses require manually moving shelves, grills, or the location of the heat element in order to perform different tasks.

SUMMARY OF THE INVENTION

The current invention is a multi-purpose unit with spaces for heating, grilling, baking, and the like. The unit's interior spaces are selectively closeable by one or more doors attached to upstanding sidewalls. A heat source in the heating space may be moved up or down with a positioner in order to suit the desired purpose: baking, grilling, cooking, smoking, barbequing, or providing a fire pit.

In one embodiment, the unit may be configured for fire usage and arranged with the grilling space adjacent the top of the unit, the heating space adjacent the base of the unit, and the baking space located above the heating space. The positioner may be operably configured with the heat source to adjust the heat source closer or further away from the baking and grilling spaces.

In another embodiment a combination outdoor grill, oven, smoker, and fire pit set is disclosed. The set may be configured having a unitary body with an interior volume selectively closeable by one or more doors pivotally attached to an upstanding sidewall spaced between a base and a top. The volume within the set may be divided into spaces for grilling, baking, and heating. The grilling space houses a grilling rack. The baking space houses a baking rack. The heating space, located between the baking or grilling space and the base, houses a heat source. The heat source may be positionable between a first position generally adjacent the base and a second position generally adjacent the baking or grilling space.

Another embodiment of the invention is a method for cooking and providing fire pit ambience with a multi-purpose unit configured for varied usage of a generally enclosed fire. The interior volume may be selectively closable with one or more doors attached at the sidewall. A heat source heats the interior volume of the unit. Grilling may be done on a grill rack within the interior volume generally adjacent the top. Baking may be done on a baking rack within the interior volume. The baking and grilling temperature may be adjusted by moving the heat source relative to the grilling and baking racks.

BRIEF DESCRIPTION OF THE DRAWINGS

While the specification concludes with claims particularly pointing out and distinctly claiming the invention, it is believed that the various exemplary aspects of the invention will be better understood from the following description taken in conjunction with the accompanying drawings, in which:

DETAILED DESCRIPTION OF THE PREFERRED EMBODIMENTS

Figure 1:
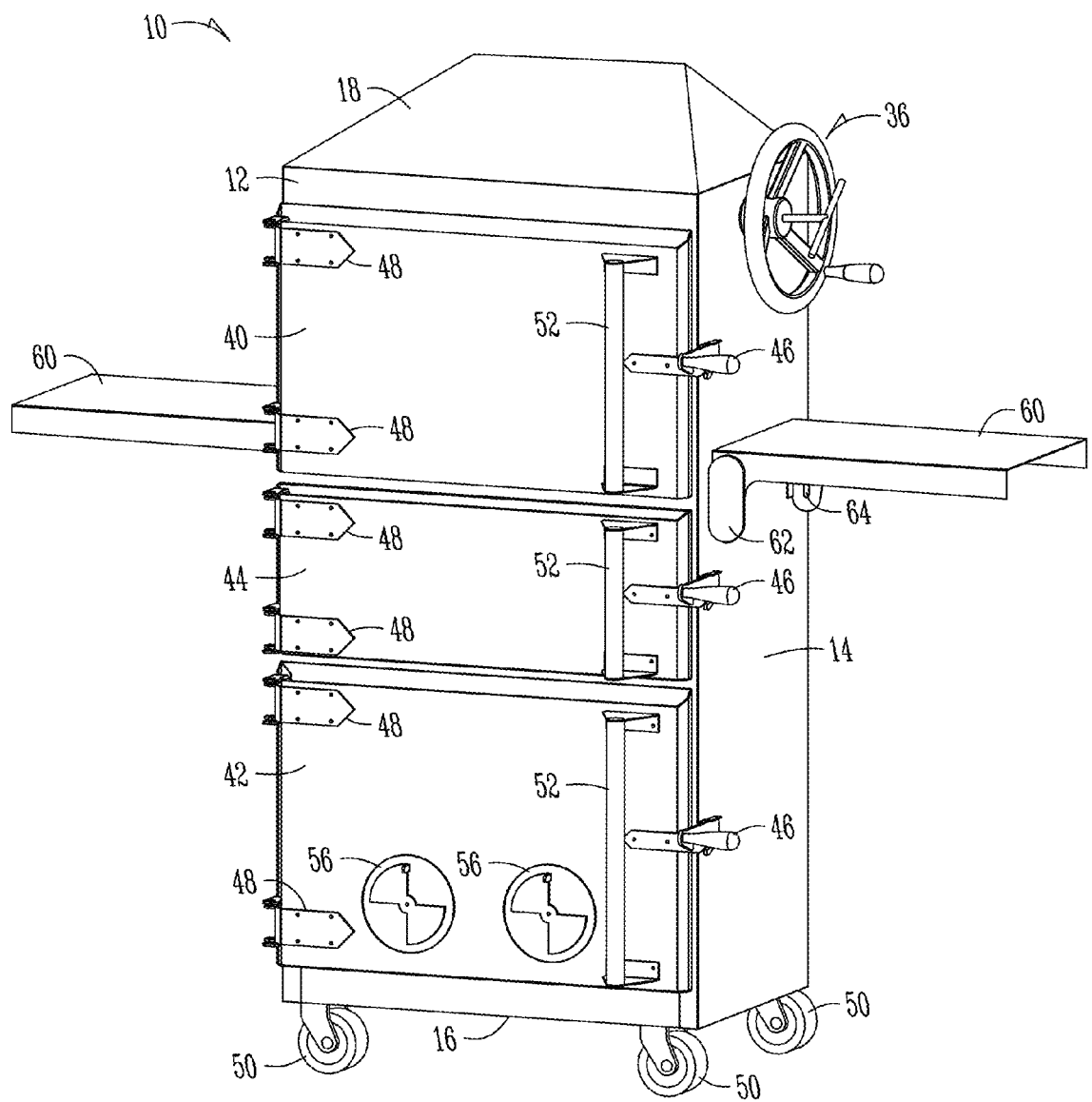
FIG. 1 is a pictorial representation of a multi-purpose unit in accordance with an illustrative embodiment.

Exemplary embodiments for various methods, systems, and apparatuses for heating, baking, barbequing, smoking, and grilling in a multi-purpose unit 10 are described below and depicted in accordance with several illustrative embodiments in FIGS. 1-9. According to one embodiment depicted in FIG. 1, the unit 10 may be configured to have a unitary body 12 enclosing an interior volume. The unitary body 12 includes a base 16 and a top 18 spaced apart by sidewalls 14 and back wall 15. Spaced between sidewalls 14 are a set of doors 40, 42 and 44. The sidewalls 14, back wall 15 and doors 40, 42 and 44 are configured to reside in a vertical plane. The unit 10 may be fully or at least partially insulated (e.g., the sidewalls 14, back wall 15 doors 40, 42 and 44, top 18, base 16, and/or other lining, walls and/or surfaces may be insulated). The unit 10 may also be configured with a damper, a flue 54 (see FIG. 2) and one or more vents 56 (see FIG. 7) for controlling airflow through the unit 10.

The base 16 may be supported by wheels 50, such as casters, to enable the unit to be moved easily from place to place. In an alternative embodiment, the base of the unit may be configured to rest directly on a surface such as the floor or ground. In another alternative embodiment, the base may be supported by a plurality of legs, such as a leg at each corner of the base 16. The wheels 50 may include brakes to keep the unit 10 from moving.

Figure 6:
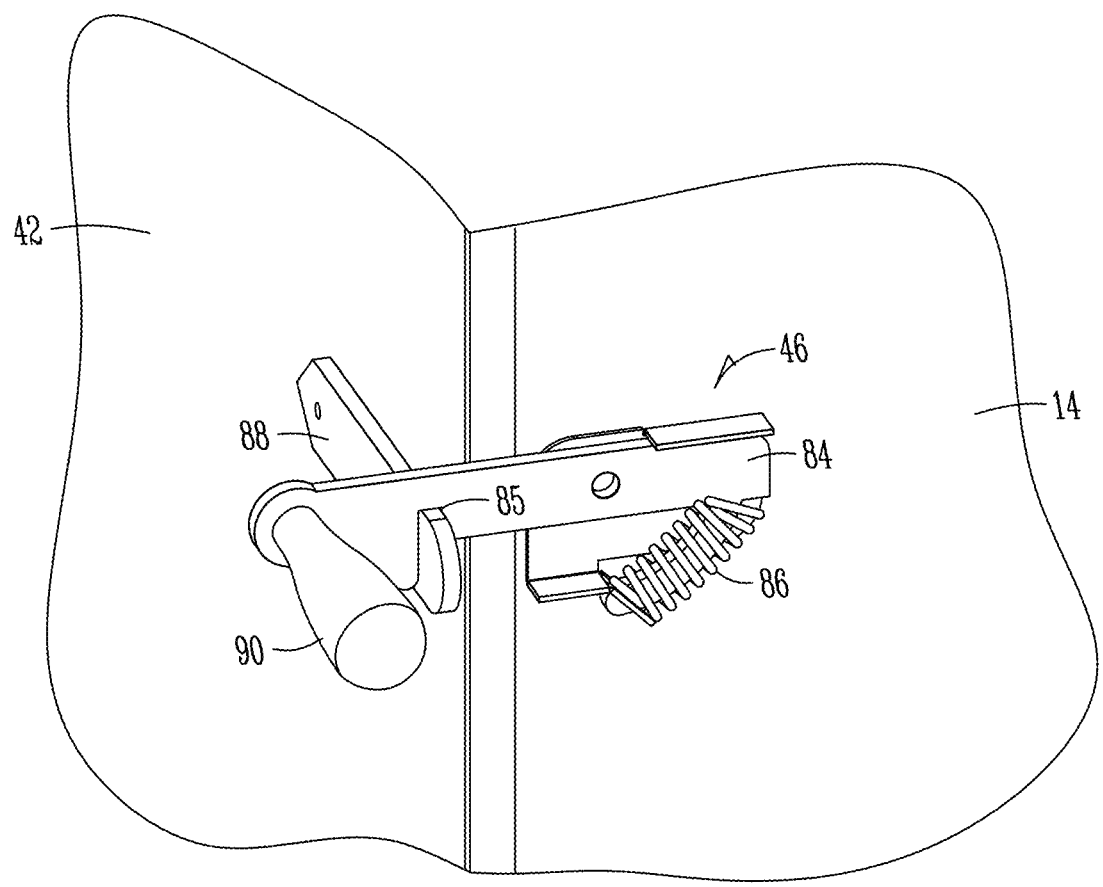
FIG. 6 is a pictorial representation of a latch in accordance with an illustrative embodiment.

The set of doors 40, 42, and 44 are configured to articulate along one of their side edges using hinges 48 and handles 52. In one embodiment, the doors 40, 42 and 44 may have knobs or other elements to grip and pull. The doors may also be secured shut using one or more door latches 46 (see FIG. 6). The hinges 48 may be mounted to respective doors 40, 42 and 44 so that the doors articulate about a vertical edge or horizontal edge of the door. According to one design, the hinges 48 may be configured as pictorially represented in FIG. 1. Alternatively, the hinges may be configured on either vertical side edge of doors 40, 42 and 44. In another embodiment, hinges 48 may be configured on the bottom horizontal edge of doors 40, 42 and 44 to allow the doors to open by rotating from a generally vertical orientation to a generally horizontal orientation (e.g., akin to an oven door). Additionally, doors 40, 42 and 44 may each be configured as a pair of doors with hinges 48 on respective outer vertical side edges of each door (e.g., akin to a kitchen cabinet). Each door 40, 42 and 44 may include a latch 46 as best illustrated in FIG. 6. The latch may be configured to include a keeper 84 biased to a closed position by a biasing element 86, such as a spring element. The keeper may include a handle 90 to allow the hinge 46 to be manipulated from a biased closed position to an open position. The keeper 84 includes a notch 85. A striker bar attached to the door is received within the notch 85 in the keeper 84 to keep the door in a closed position. To open the door, the keeper 84 is manipulated, for example, using handle 90 from the biased closed position to an open position where the striker bar 88 is separated from the notch 85. Similarly, to close the door, the keeper 84 is manipulated, for example, using handle 90 to an open position from the biased closed position to allow the striker bar 88 to be received within the notch 85 in the keeper 84. In this manner, doors 40, 42 and 44 may be maintained or otherwise locked in a closed position using latches 46. Other latch configurations and designs are contemplated as are customary for securing the free end of a cabinet door to a cabinet body.

Figure 7:
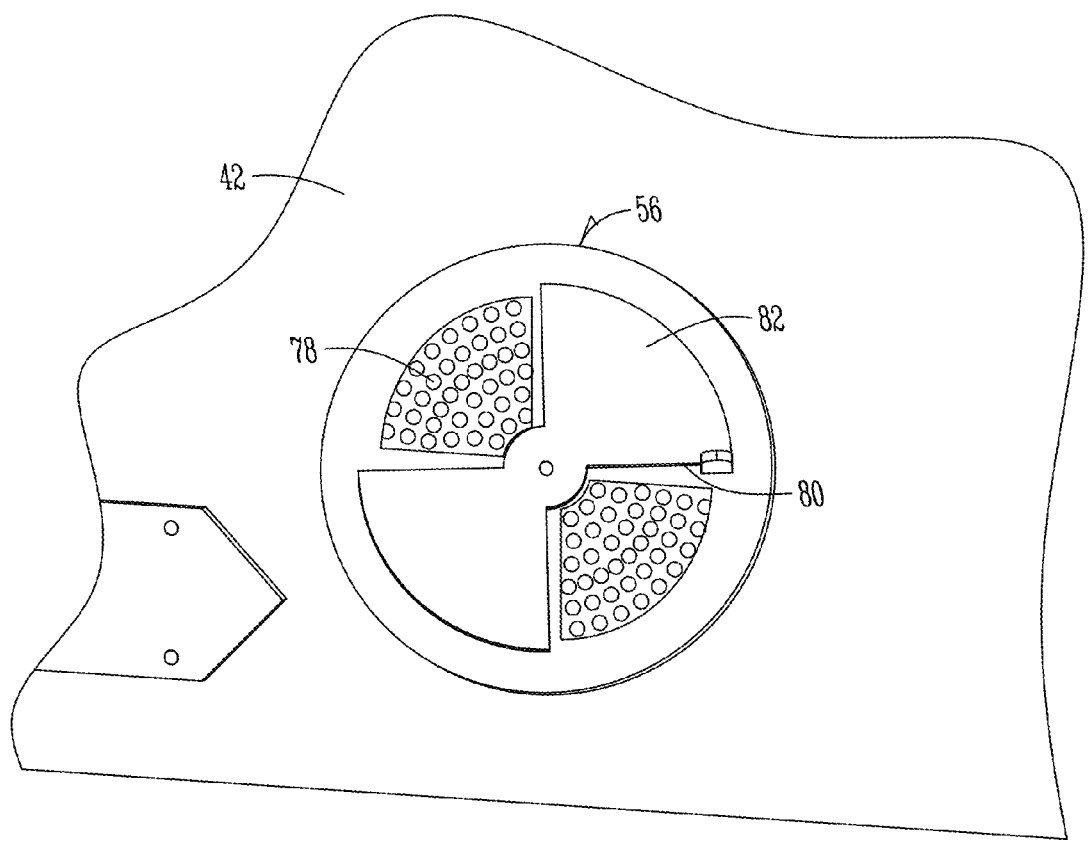
FIG. 7 is a pictorial representation of a vent in accordance with an illustrative embodiment.

One or more of the doors 40, 42 and 44, a sidewall 14, a back wall 15 or other wall of the unit 10 may be configured with one or more vents 56, as best illustrated in FIG. 7 and further addressed below. The vent 56 is designed to be housed within an aperture or opening in a wall, door or other surface of the unit 10. The vent 56 includes a screen 78 for generally covering the opening 80 and a cover 82 rotatable between the open and closed position. In the open position the cover 82 is rotated so as to leave the opening 80 in the open position whereby air can travel through screen 78 and opening 80. In the closed position cover 82 covers the opening 80 to generally prevent air from moving through screen 78 and opening 80. Screen 78 may also be configured, based on screen sizing, to control the passage of hot embers, coals, or other hot debris that might otherwise escape from the unit 10 through opening 80.

Figure 2:
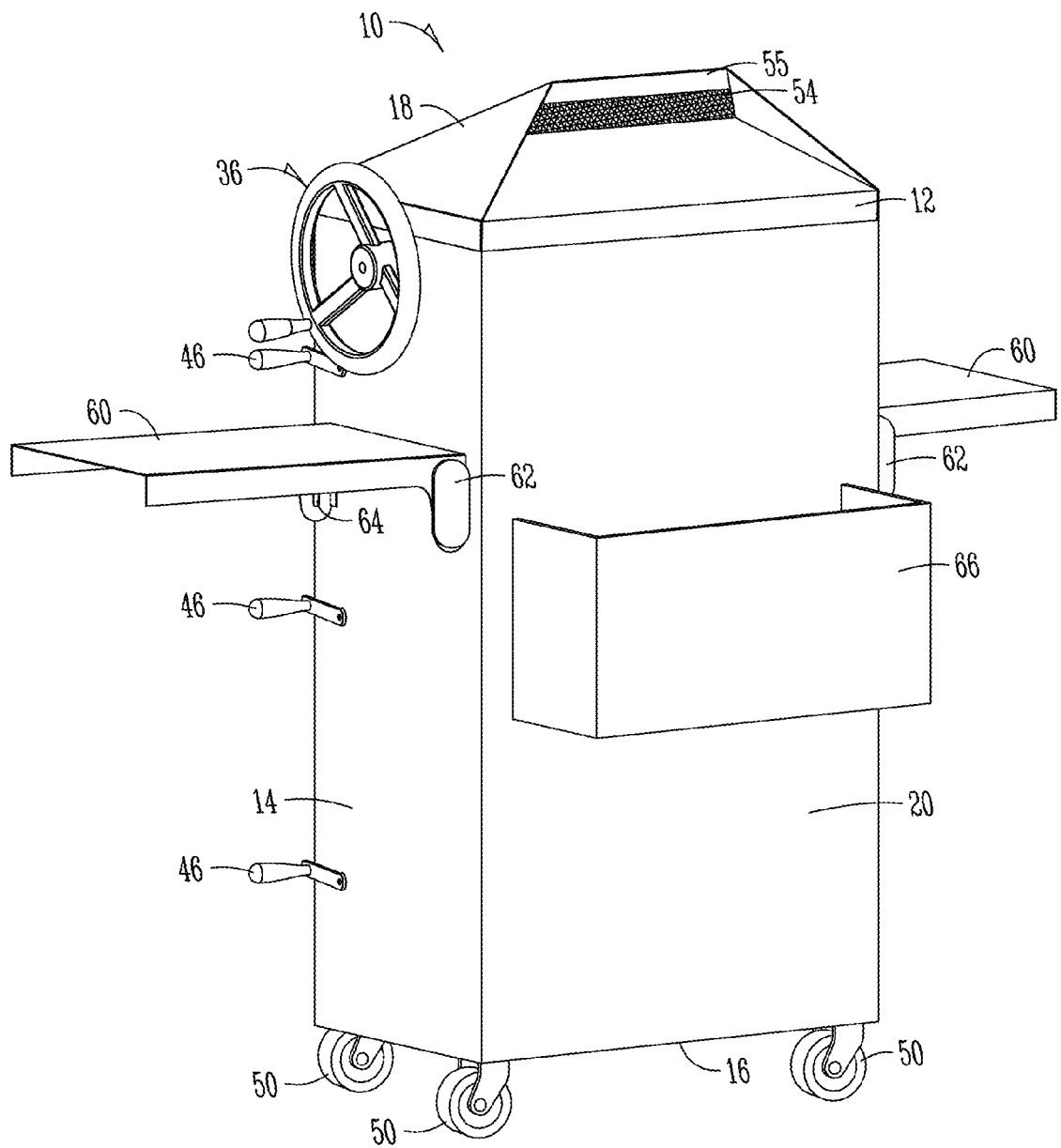
FIG. 2 is another pictorial representation of the multi-purpose unit shown in FIG. 1 in accordance with an illustrative embodiment.
Figure 3:
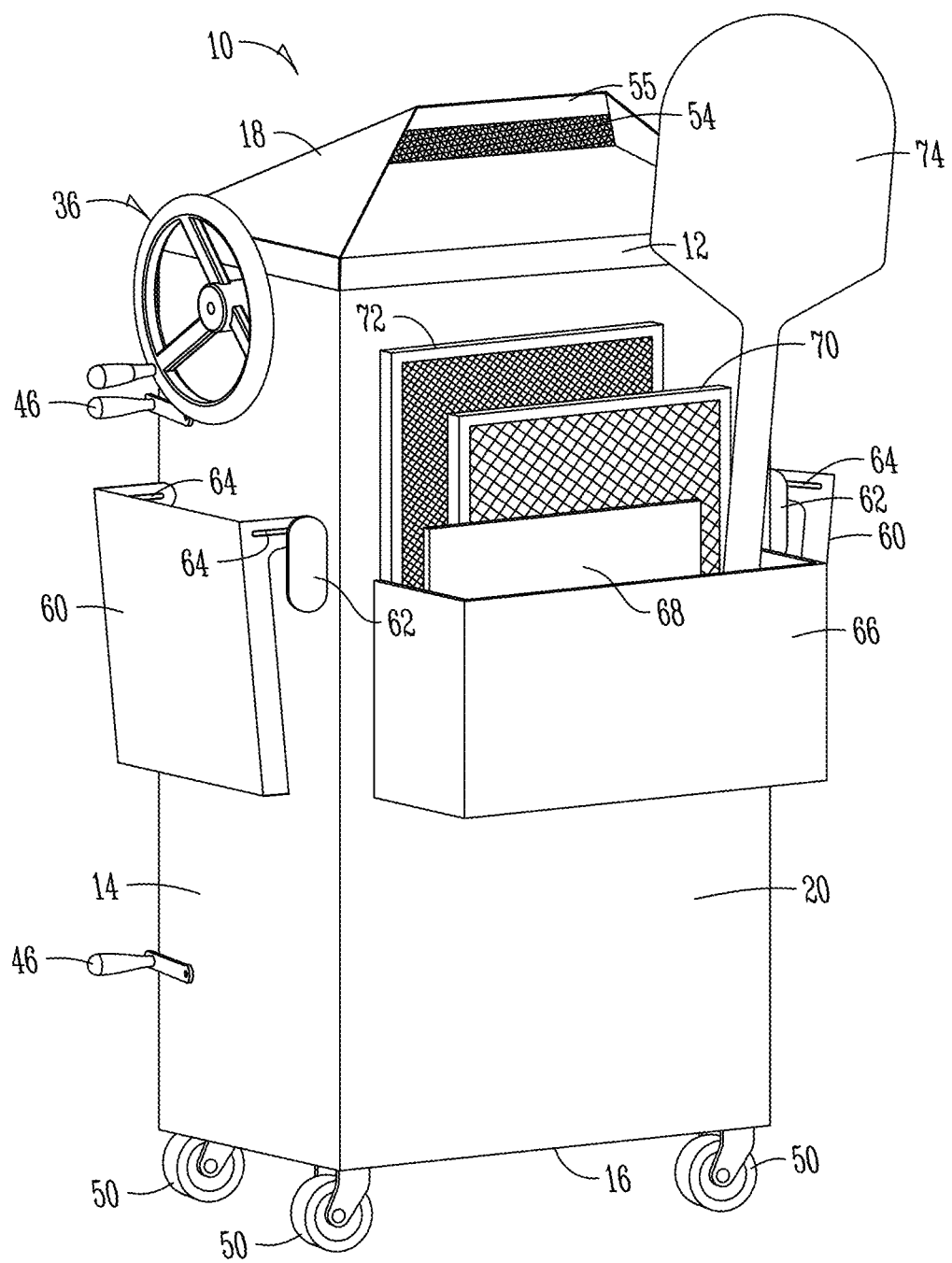
FIG. 3 is yet another pictorial representation of the multi-purpose unit in accordance with an illustrative embodiment.

As best illustrated in FIGS. 2 and 3, the unit 10 may include one or more shelves 60 operatively attached to the exterior of the unit 10 (e.g., sidewalls 14, back wall 15, or even one or more of the doors 40, 42 or 44). According to one exemplary embodiment, shelves 60 are attached to opposing sidewalls 14 of the unit 10. Alternatively, a single shelf 60 may be attached to one of the sidewalls 14 of the unit 10. The shelves 60 include a hinge 64 attached to a bracket 62 whereby the shelves 60 may be manipulated between a generally horizontal position (see FIG. 2) and a stowed position (see FIG. 3). According to one design, brackets 62 include one or more elements (not shown) received in hinge 64. The shelf 60 is rotated about the bracket 62 using hinge 64. For example, rotating the shelf from the stowed position to a generally horizontal position allows an element on each bracket 62 to slide from a bottom position to a top position of the hinge 64, which secures the shelf in the generally horizontally position. Conversely, lifting the shelf 60 upward moves the element on the bracket 62 to the bottom of the hinge whereby the shelf 60 may be rotated from the generally horizontal position shown in FIG. 2 to the a stowed position shown in FIG. 3. Other lockable hinge designs are contemplated as are customary for locking a shelf in a generally horizontal position and unlocking the shelf to allow the shelf to be moved from a generally horizontal position to a generally vertical position or a stowed position. Also, as best illustrated in FIGS. 2 and 3, a sidewall 14 or back wall 15 of the unit 10 may be configured with a pocket 66 for stowing one or more components, pieces or tools for the unit. According to one exemplary embodiment, the back wall 15 may be configured with a pocket 66 for housing a cooking stone 68, a cooking rack 70 and 72 and a peel 74. The pocket 66 may be used to house any one or more tools, components, or parts of the unit 10. Other surfaces of the unit 10 may also be configured with like pockets for stowing like items.

The top 18 of the unit 10 is configured with a flue 54. The flue 54, according to one embodiment, is covered by a screen to prevent hot embers, ash, or other debris from being discharged out the flue 54. Similarly, a cover 54 may be configured over top of, and for example, along the length of the flue 54 to direct the flow of hot gases from the inside of the unit 10 to the exterior. The cover 54 may be configured to articulate about an attached edge to open and close the flue 54 according to one design. The size of the flue 54 may also be configured to control the flow and release of hot gases and smoke from the inside of the unit either alone or in combination with the size of the opening 80 for the vents 56.

Figure 4:
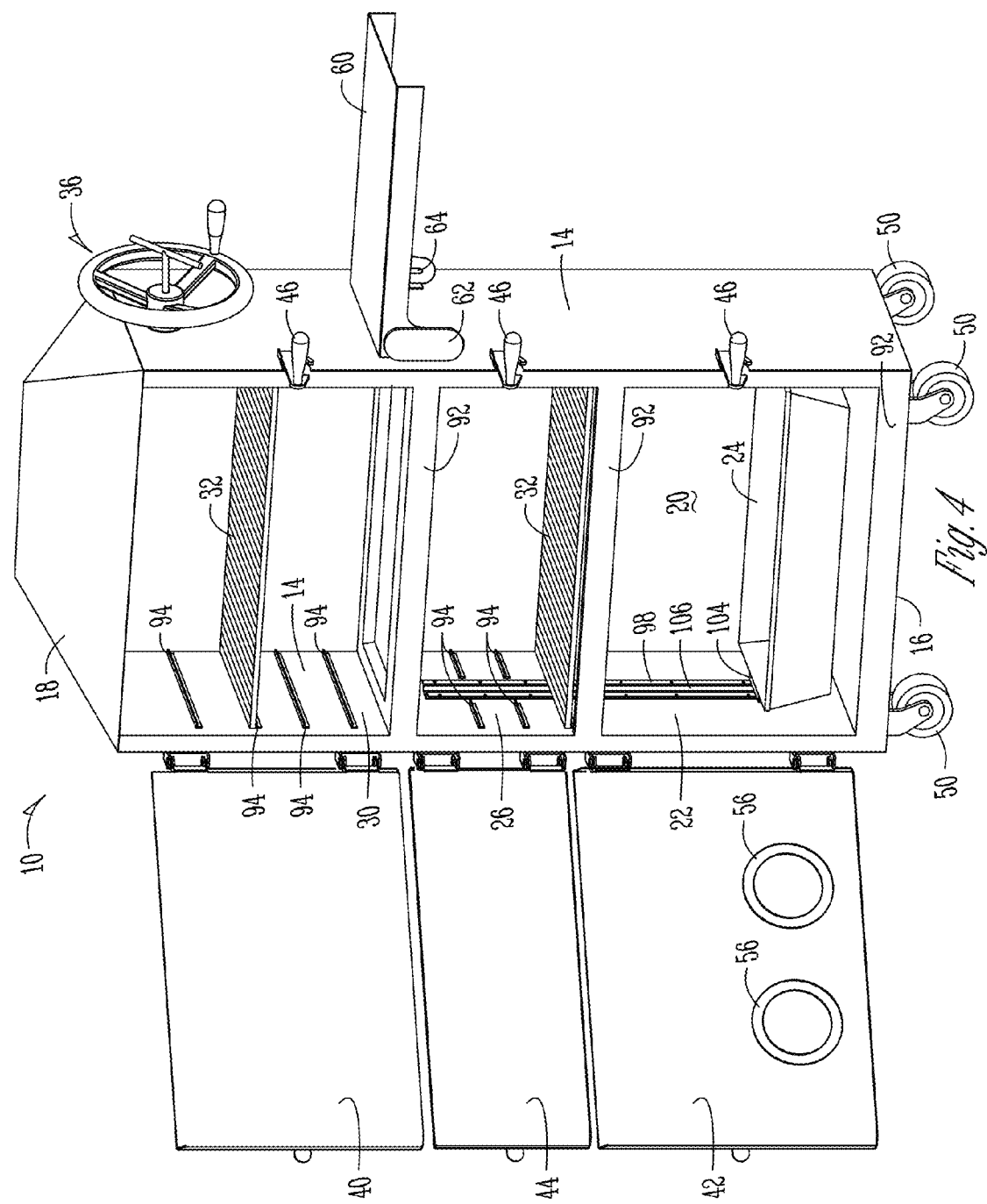
FIG. 4 is a pictorial representation of the interior of the multi-purpose unit shown in FIG. 1 in accordance with an illustrative embodiment.
Figure 5:
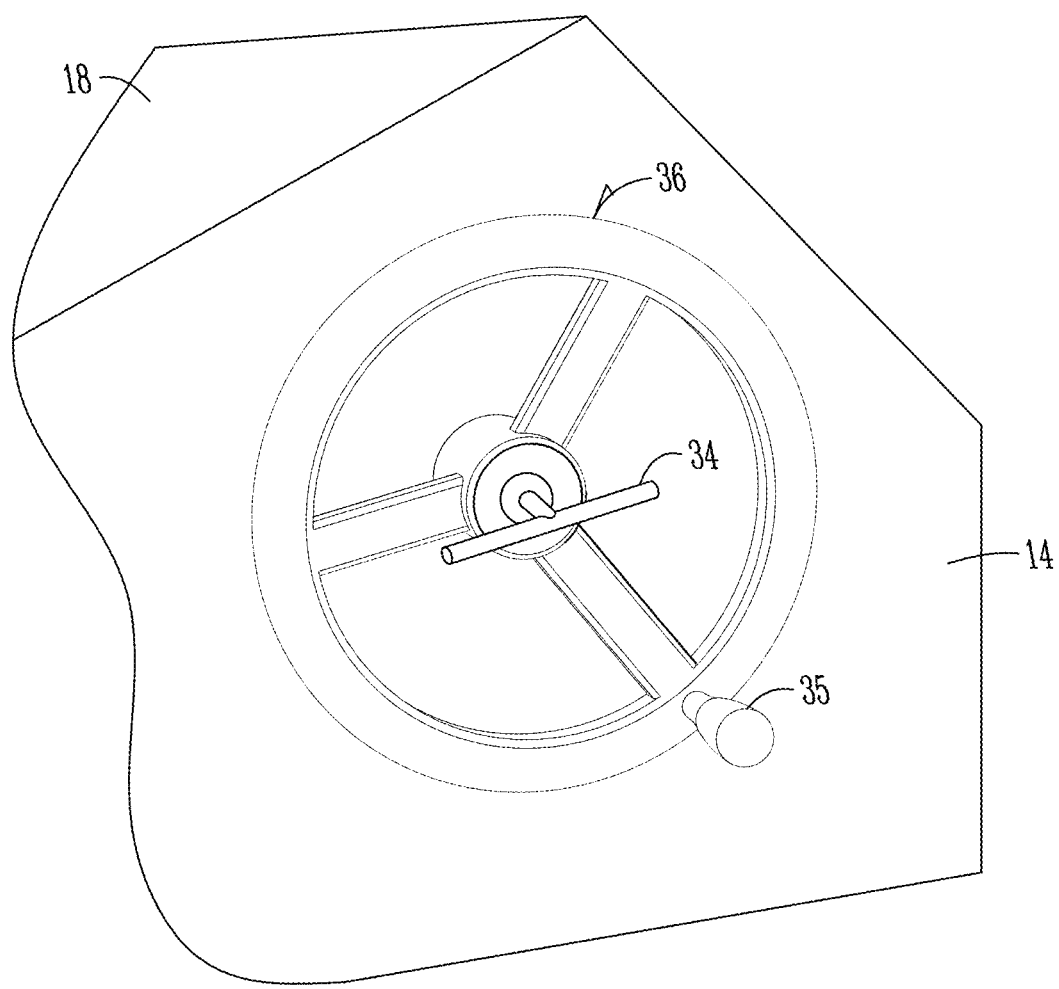
FIG. 5 is a pictorial representation of a grate adjusting system in accordance with an illustrative embodiment.

As best illustrated in FIG. 4, according to one embodiment, doors 40, 42 and 44 may be selectably opened to reveal a firebox 22, cooking space 26 and cooking space 30. Although a firebox 22, cooking space 26 and cooking space 30 are discussed here, other spaces for specific purposes are contemplated throughout the disclosure as circumstances may suggest and are rendered expedient. The firebox 22 is generally coverable by door 42, cooking space 26, generally coverable by door 44 and cooking space 30 generally coverable by door 40. A seal (not shown) on door 42 seats against the side edges of sidewalls 14 and cross members 92 in the closed position shown in FIG. 1. Similarly, a seal (not shown) on door 44 seats against side edges of sidewalls 14 and cross members 92 when door 44 is in the closed position shown in FIG. 1. Like door 44, a seal (not shown) on door 40 seats against the edges of sidewalls 14 and cross members 92 when door 40 is in the closed position shown in FIG. 1. The cooking spaces 26 and 30 are generally located above firebox 22. The unit 10 may be configured whereby either cooking space 26 or 30 is located adjacent the top 18 of the unit 10. As illustrated in FIG. 4, the firebox 22 is located adjacent the base 16 of the unit 10 but capable of being moved to other locations within the unit. Cooking space 30 is located adjacent the top 18 of the unit 10 and cooking space 26 is located between cooking space 30 and the firebox 22. In one design, cooking space 26 may be configured for baking and smoking and cooking space 30 may be configured for grilling, smoking and barbequing. Conversely, cooking space 26 may be configured for grilling, smoking and barbequing and cooking space 30 for baking and smoking. Suffice it to say, the cooking spaces 26 and 30 may be configured for any number of applications as contemplated herein, including any cooking applications as are customary.

Located on opposing interior sidewalls 14 of the unit 10 are a plurality of rails 94. Using the rails 94, any number of cooking racks may be positioned in various locations within cooking space 26 and/or cooking space 30. Depending upon the cooking application, a pan 96 may also be positioned along one of the opposing sets of rails 94 underneath, for example, one of the cooking racks 32. The pan 96 may be configured as a drip pan for collecting drippings from food being cooked on an above situated cooking rack 32 and/or as a water pan for increasing the humidity within the unit 10. The cooking racks 32 may be removed for cleaning, conditioning and replacement in the same location or another location supported by an opposing pair of the plurality of rails 94. Thus, the cooking racks 32 may be moved to various locations within the unit according to the type of cooking that is being performed. In one embodiment, the cooking racks 28 may be configured as grilling grates which may be made from stainless steel, porcelain-coated steel, chrome-plated steel, cast iron, porcelain-coated cast iron, porcelain-coated aluminum, or chrome-plated aluminum. According to one aspect of the invention, the rails 94 may be configured so as to be removable from the sidewalls 14 and repositioned in another location to adjust the height and/or position of cooking racks 32 within the unit. In another embodiment, the rails 94 may be configured to slide up and down along respective sidewalls 14 of the unit. In view of the foregoing, the present invention contemplates placement and location of cooking surfaces, racks, pans or other items within the unit 10 at various locations according to the type of cooking being performed. For example, according to one embodiment, cooking stone 68 may be positioned within cooking space 26. The cooking stone 68 may be configured as a permanent shelf or as a removable rack. In one exemplary embodiment, a cooking rack 28 may be used to support a cooking stone 68 for absorbing and releasing heat. The cooking stone may be a baking stone, pan or screen. The cooking stone 68 may be made of clay, brick, ceramic, soapstone, granite, or Fibrament®. Similarly, a baking pan 96 made of, for example, cast iron, steel, or aluminum may be positioned atop one of the cooking racks 32 within the unit. The cooking stone 68 may be positioned in cooking space 26 and/or cooking space 30. Similarly, the pan 96 may be positioned likewise.

Figure 8:
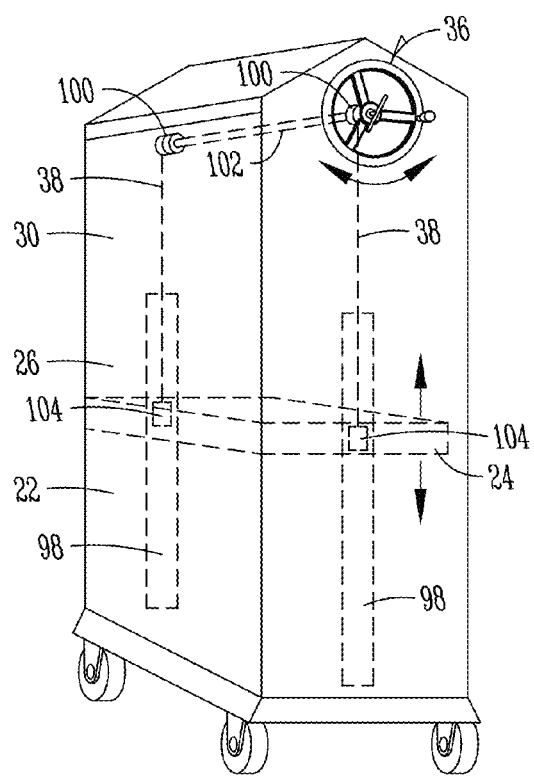
FIG. 8 is a pictorial representation of a grate adjusting system in accordance with an illustrative embodiment.
Figure 9:
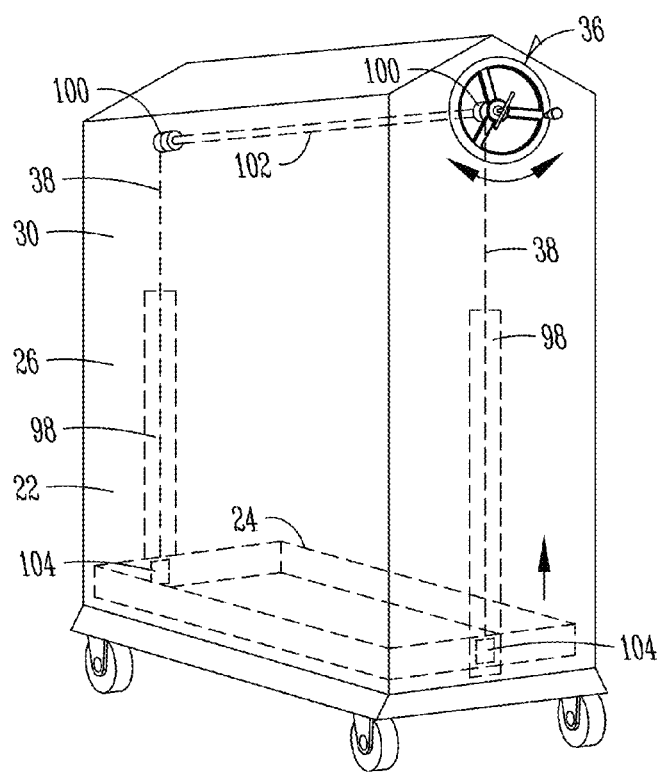
FIG. 9 is another pictorial representation of the grate adjusting system shown in FIG. 8 in accordance with an illustrative embodiment.

As best illustrated in FIGS. 4, 8 and 9, a grate 24 is positioned within the firebox 20. The grate 24 is configured to hold any type of combustible material, such as wood, briquettes, wood chips, or other like sources of heat and/or smoke. Alternatively, the grate 24 may be replaced by a gas burner whereby gas such as propane may be used as a heat source. The grate 24 is configured to move up and down within the unit 10. A grate adjusting system 36 is operatively attached to the grate 24 to move the grate 24 up and down within the unit to change the distance between the source of heat within the grate and the cooking spaces 26 and 30. For example, the intensity of heat adjacent a cooking rack 32 may be adjusted simply by moving the grate closer to or further from the cooking rack 32. According to one embodiment, the grate 24 includes sliders 104 on opposing sides of the grate 24. The sliders 104 are received within tracks 98 configured within the interior surface of opposing sidewalls 14 of the unit 10. The track 98 is configured to extend generally from the base 16 in a vertical direction in the sidewall 14 and may terminate at any point along the height of the sidewall. For example, the track 98 may terminate in cooking space 26 or cooking space 30. The rails 94 may include slots 106 through which sliders 104 on opposing sides of grate 24 may pass through when the grate 24 is moved upward within the unit 10 past opposing sets of rails 94. According to one embodiment, opposing cables are attached at their opposing ends to the opposing sliders 104 on the grate 24 and pulleys 100 attached to rod 102 configured in the top 18 of the unit 10. The rod 102 has a first end connected to a handle 35 and opposing end configured with a cap 76 (see FIG. 3). The rod 102 may be rotated clockwise and counterclockwise by operation of handle 35. Grate adjusting system 36 includes a brake 34 for locking the position of the grate adjusting system 36 and the position of the grate 34 within the unit 10. According to one aspect, grate adjusting system 36 may be operated to adjust the position of the grate 24 within the unit. For example, turning the handle 35 clockwise or counterclockwise, the cables are rolled up on respective pulleys 100 thereby raising the grate 24 from a position adjacent the base 16 of the unit 10 to a position adjacent cooking space 26 or cooking space 30. Conversely, the handle 35 may be rotated in the opposite direction to lower the grate 24 within the unit. In this manner, the grate 24 may be moved up and down within the unit to change the distance between the heat source and a specific cooking rack 32, pan 96, cooking stone 68 or other item within the unit. Thus, as the cable 38 winds up on pulley 100 the grate moves upward within the unit and as the cable 38 unwinds from the pulley 100 the grate 24 moves downward within the unit. The grate 24 may be adjusted according to the type of cooking being performed. According to an alternative embodiment, a motor may be configured to rotate the rod 102 to raise and lower the grate 24. Additionally, the grate adjusting system 35 may be an actuator. The actuator may be mechanical, electrical, hydraulic, or pneumatic. In one exemplary embodiment, the grate adjusting system 36 may be controlled using a remote actuator, such as a remote control. Alternatively, the grate adjusting system 36 may be controlled by a switch or button. In another embodiment, the grate adjusting system 36 may be automated to adjust the grate up and down to maintain a certain temperature in either cooking space 26 or 30, such as, based upon feedback from a temperature gauge or thermoster. For example, the unit 10 may include one or more thermometers located within each cooking space to monitor the temperature. An intelligent control (not shown) may be configured in communication with one or more of the temperature gauges and a motor to adjust the position of the grate 24 to maintain a desired temperature in any one of the interior spaces. As previously discussed, a preferred heat source of the present invention includes combustible materials such as wood or charcoal. An alternative embodiment of the heat source may be gas (e.g., natural gas or propane) or electric. Additionally, pan 96 may be used as a smoker tray whereby chips or other smokeable type material may be inserted into the unit 10 to smoke items in the cooking spaces. In one embodiment, a cooking rack 32 may be used to support a pan 96 for smoking. Alternatively, rails 94 may be used to support a pan 96 for smoking food within one or more of the cooking spaces.

As pictorially represented, doors 40, 42 and 44 may be closed or left open during operation of the unit 10. The doors 40, 42 and 44 may be left partially open to control the flow of air through the unit. For example, door 42 may be swung open and positioned generally adjacent sidewall 14. Thus, the firebox 22 may be used to provide a fireplace-like warmth and ambience. For example, a fireplace screen (not shown) may be attached so that it extends across the open space when door 42 is opened to use the firebox 22 akin a fireplace or fire pit. According to another embodiment, door 42 may be configured with an inner and outer door. The outer door may be opened and the inner door left closed when using the firebox 22 as a fireplace or fire pit. The inner door may include holes or slots to allow heat and light to pass through for use of the firebox 22 as a fireplace or fire pit. Additionally, the back wall 15 of the unit 10 may be configured with a door akin to door 42 whereby the firebox 22 may be exposed with the exception of sidewalls 14 to provide a fireplace like warmth and ambience from both the front and back of the unit 10. Similarly, cooking space 26 and 30 may be configured with doors akin to door 40 and door 44 on the back wall 20 of the unit 10. According to another embodiment, the doors may be hingedly attached at the sidewalls 14 and opened upward. In another embodiment, the doors may be attached horizontally and open downward or upward. In yet another embodiment, the doors may be configured to open in a sliding motion. One or more of the doors may be configured on the front or the back of the unit, or even the side of the unit. Alternatively, the unit may have one single door covering the entire front side of the unit or the entire back side of the unit. In another embodiment, the doors may be located on different sides of the unit. For example, door 40 covering cooking space 30 may be located on the front of the unit 10 whereas door 44 covering cooking space 26 may be located on the back side of the unit. In another embodiment, there may be multiple doors to access each space in the unit. For example, cooking space 30 may be accessed from the front or the back of the unit using respective doors. Additionally, the firebox 22 may have doors on all sides in order to allow heat and light to radiant in all directions.

Using vents 56, flue 54 and grate adjusting system 36, the intensity and location of the heat may be adjusted to obtain/create various cooking parameters. For example, cooking space 30 may be used for grilling, smoking or barbequing whereas cooking space 26 may be used for baking and smoking. The cooking racks 32 may be used as grilling racks. Other cooking surfaces are contemplated such as a cooking stone 68 or a pan to be used as a coffee bean roaster, drip pan or smoking pan. Some of the cooking racks 32 may be removed to adjust the position of the grate 24 within the unit, such as for positioning the grate 24 in cooking space 30. In another embodiment, the body 12 of the unit 10 may be configured as separate modules, sections or pieces whereby they may be stacked together to form the body 12 of the unit to meet various design parameters and configurations. For example, multiple cooking spaces could be stacked one on top of another to create a larger unit or one cooking space could be removed to create a smaller unit. The cooking spaces could be created as modules whereby one or more of the cooking spaces including a firebox 22 are stacked on the base 16 and capped with the top 18 and include a grate adjusting system for adjusting the position of the grate 24 within the unit.

The present invention is not to be limited to the particular embodiments described herein. In particular, the present invention contemplates numerous variations in the type of ways in which embodiments of the invention may be applied to a multi-purpose unit performing one or more heating, grilling, barbequing, smoking, baking or other like operations. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes, or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and it is intended to be limiting in scope. The following claims set forth a number of the embodiments of the invention disclosed with greater particularity.

What is claimed is:

1. A multi-purpose unit with heat source positioning, comprising:
    a fire enclosure having an interior volume selectively closeable by one or more doors spaced between a base and top connected with upstanding sidewalls;
    a flame origin within the fire enclosure, the flame origin having at least one operated position adjacent the base of the fire enclosure;
    a flame positioner in operable control of the flame origin, the flame positioner occupying a plurality of positions within the fire enclosure between the base and top;
    wherein the flame origin is positionable at anyone of the plurality of positions in the fire enclosure by operation of the flame positioner;
    wherein the flame positioner has a grilling position, a baking position and an ambience position; and
    respective sets of one or more doors for each of the grilling position, the baking position and the ambience position.

2. The unit of claim 1 wherein the one or more doors are separated by a pair of the opposing, upstanding sidewalk.

3. The unit of claim 1 further comprising an exteriorly mounted portion of the flame positioner at the top of the fire enclosure.

4. The unit of claim 1 further comprising a fire grate operably connected to the flame positioner.

5. The unit of claim 1 wherein at least one of the upstanding sidewalls contains the flame positioner.

* * * * *